US012428005B2

(12) United States Patent
Kasaiezadeh Mahabadi et al.

(10) Patent No.: US 12,428,005 B2
(45) Date of Patent: Sep. 30, 2025

(54) ARCHITECTURE AND METHOD FOR STEER-BY-WIRE FAILURE BACKUP USING DIRECT YAW CONTROL ACTUATORS

(71) Applicant: GM Global Technology Operations LLC, Detroit, MI (US)

(72) Inventors: SeyedAlireza Kasaiezadeh Mahabadi, Novi, MI (US); Hassan Askari, Thornhill (CA); Saurabh Kapoor, Windsor (CA); Reza Zarringhalam, Whitby (CA); Ehsan Asadi, Markham (CA); Seyedeh Asal Nahidi, North York (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 18/468,979

(22) Filed: Sep. 18, 2023

(65) Prior Publication Data

US 2025/0091593 A1  Mar. 20, 2025

(51) Int. Cl.
*B60W 50/029* (2012.01)

(52) U.S. Cl.
CPC ... *B60W 50/029* (2013.01); *B60W 2050/0297* (2013.01); *B60W 2510/20* (2013.01); *B60W 2520/26* (2013.01); *B60W 2520/28* (2013.01); *B60W 2720/28* (2013.01)

(58) Field of Classification Search
CPC ....... B60W 50/029; B60W 2050/0297; B60W 2510/20; B60W 2520/26; B60W 2520/28; B60W 2720/28
See application file for complete search history.

(56) References Cited

U.S. PATENT DOCUMENTS

| | | | |
|---|---|---|---|
| 2011/0307129 A1* | 12/2011 | Yu | B60W 30/02 701/22 |
| 2020/0108866 A1* | 4/2020 | Lapis | B62D 9/002 |
| 2020/0377150 A1* | 12/2020 | Hidaka | B62D 5/0484 |
| 2021/0061063 A1* | 3/2021 | Sun | F01P 3/02 |
| 2021/0197778 A1* | 7/2021 | Shi | B60T 8/1761 |

(Continued)

FOREIGN PATENT DOCUMENTS

DE  102016006466 A1  11/2017

OTHER PUBLICATIONS

Dominguz-Garcia et al., A Backup System for Automotive Steer-by-Wire, Actuated by Selective Braking, 2004, 35th Annual IEEE Power Electronics Specialists Conference, pp. 383-388 (Year: 2004).*

(Continued)

*Primary Examiner* — Sze-Hon Kong
(74) *Attorney, Agent, or Firm* — Vivacqua Crane, PLLC

(57) ABSTRACT

A method for controlling a steer-by-wire system, comprising receiving vehicle data and a steering request from a vehicle, determining whether a steering road wheel actuator of the vehicle has failed using the vehicle data, in response to determining that the steering road wheel actuator of the vehicle has failed, determining a target wheel slip of the vehicle based on the steering request, maintaining the target wheel slip of the vehicle while the vehicle is in motion; and adjusting a wheel speed of at least one wheel of the vehicle based on a feedback signal, wherein the feedback signal is indicative of a road wheel angle while the vehicle is in motion.

20 Claims, 2 Drawing Sheets

(56) References Cited

U.S. PATENT DOCUMENTS

| | | | |
|---|---|---|---|
| 2023/0234641 A1* | 7/2023 | Akatsuka | B62D 7/159 |
| | | | 701/41 |
| 2024/0075981 A1* | 3/2024 | Wyciechowski | B60W 40/105 |
| 2024/0359693 A1* | 10/2024 | Schumann | B60W 10/18 |
| 2024/0359697 A1* | 10/2024 | Kim | B62D 7/159 |
| 2024/0359706 A1* | 10/2024 | Tagesson | B62D 15/025 |
| 2025/0033654 A1* | 1/2025 | Helfrich | B60W 10/22 |
| 2025/0083741 A1* | 3/2025 | Yang | B62D 6/10 |

OTHER PUBLICATIONS

Jaafari et al., Integrated Vehicle Dynamics Control Via Torque Vectoring Differential and Electronic Stability Control to Improve Vehicle Handling and Stability Performance, Jul. 2018, Journal of Dynamic Systems, Measurement, and Control, vol. 140, pp. 071003-1-071003-13 (Year: 2018).*

* cited by examiner

ARCHITECTURE AND METHOD FOR STEER-BY-WIRE FAILURE BACKUP USING DIRECT YAW CONTROL ACTUATORS

INTRODUCTION

The present disclosure relates to an architecture and method for steer-by-wire failure backup using direct yaw control actuators.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Steer-by-wire systems do not rely on mechanical connections to the vehicle's wheels. Instead, these systems cables that send electronic signals to the vehicle's gear to steer the vehicle. Many vehicles include steer-by-wire systems. It is therefore useful to develop a system and method for system-by-wire failure backup.

SUMMARY

The presently disclosed method and architecture aims to provide a torque vectoring and/or differential braking backup system for degradation of steering-by-wire (SbW) system that does not require change in the suspension/steering system and stays effective on even non-steerable axles. The wheel speed control-based method is a solution with no physical changes required in the suspension system of the vehicle. As the presently disclosed method does not expose the vehicle to wheel instability (e.g., wheel slips are being directly controlled), driving under backup system also does not impose usual side effects such as saturation of tire and potentially vehicle instability.

In an aspect of the present disclosure, a method for controlling a steer-by-wire system, comprising receiving vehicle data and a steering request from a vehicle, determining whether a steering road wheel actuator of the vehicle has failed using the vehicle data, in response to determining that the steering road wheel actuator of the vehicle has failed, determining a target wheel slip of the vehicle based on the steering request, maintaining the target wheel slip of the vehicle while the vehicle is in motion; and adjusting a wheel speed of at least one wheel of the vehicle based on a feedback signal, wherein the feedback signal is indicative of a road wheel angle while the vehicle is in motion.

The method may further include arbitrating between the target wheel slip to follow a desired path and controlling wheel instability. The steering request includes a requested steering wheel angle, and the target wheel slip of the vehicle is calculated as a function of the requested steering wheel angle. The target wheel slip of the vehicle is determined based on the steering request using an Ackermann steering geometry of the steer-by-wire system. The method may further include using a model predictive control (MPC) to maintain the target wheel slip of the vehicle while the vehicle is in motion. The MPC includes a linear time-varying (LTV) solver. The method may further include using a control strategy to maintain the target wheel slip of the vehicle while the vehicle is in motion. The control strategy depends on the driveline configuration of the vehicle.

The present disclosure also describes a vehicle including sensors, a steer-by-wire system, and a controller in communication with the sensors and the steer-by-wire system. The controller is programmed to execute the method described above. The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
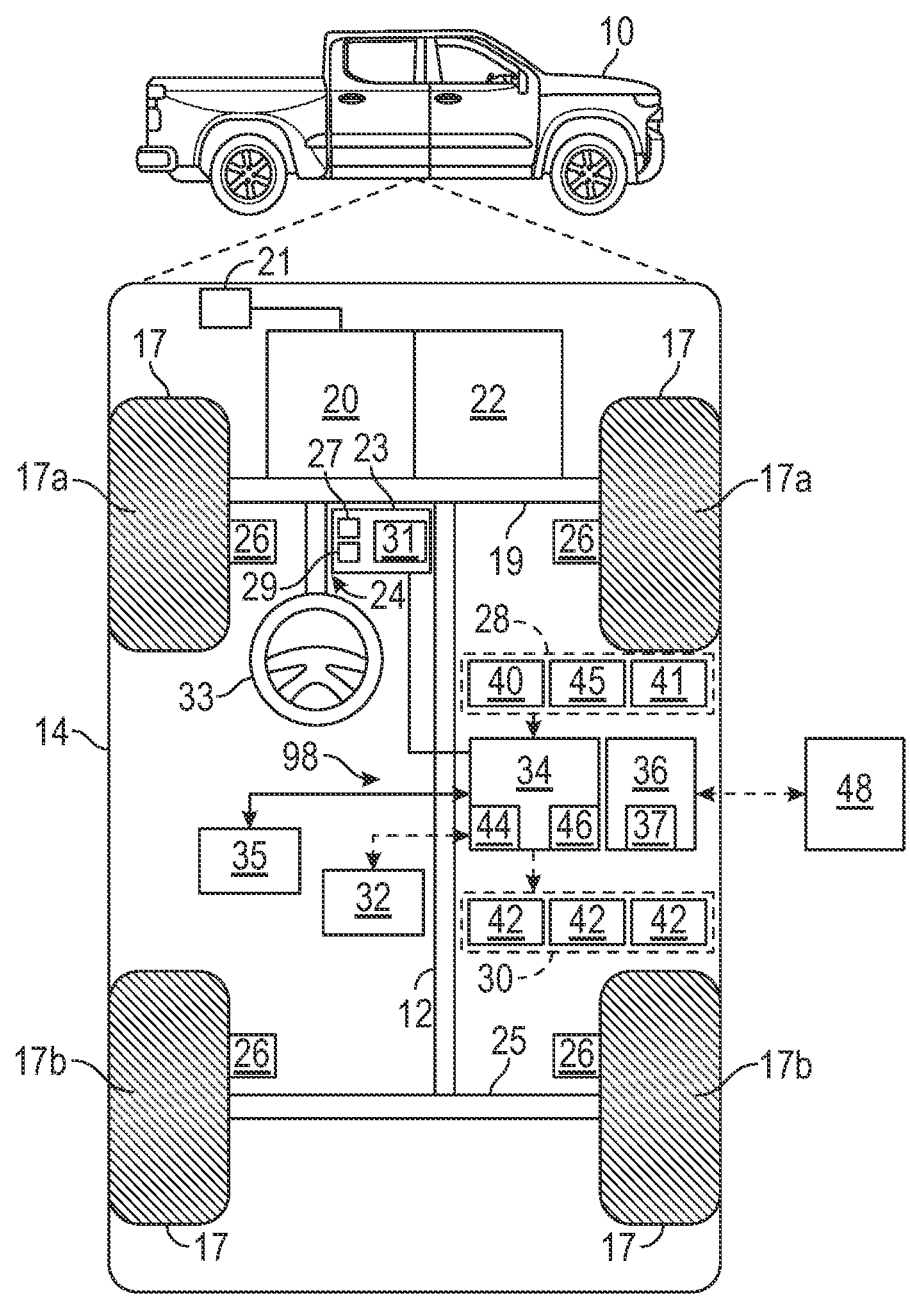
FIG. 1 is a block diagram depicting an embodiment of a vehicle including steering-by-wire system.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

The vehicle 10 is an autonomous vehicle, and a control system 98 is incorporated into the vehicle 10. The system 98 may be referred to as the system or the system for controlling the steering system 24. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may include a so-called a Level Two, a Level Three, Level Four, or Level Five driving automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the system 98 performs the entire dynamic driving task (DDT)

within the area that it is designed to do so. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The steering system 24 is a steer-by-wire system. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences the position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more steering wheel sensors 45, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more cameras 41 (e.g., eye tracker), one or more gyroscopes, one or more accelerometers, one or more inclinometers, one or more speed sensors, one or more ultrasonic sensors, one or more inertial measurement units (IMUs), one or more night-vision devices, thermal imaging sensors, and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources). The vehicle 10 and/or system 98 does not include light sensors capable of detecting light inside the vehicle 10.

The actuator system 30 includes one or more actuator 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc. The actuators 42 may be part of the steering system 24 and include one or more road wheel actuators (RWAs) and a hand wheel actuator (HWA).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 2) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a vehicle occupant 11 (e.g., a vehicle driver or a vehicle passenger). For example, the user interface 23 may include a touch screen and/or buttons configured to receive inputs from a vehicle occupant 11. Accordingly, the controller 34 is configured to receive inputs from the user via the user interface 23. The vehicle 10 may include one or more displays 29 configured to display information to the vehicle occupant 11 (e.g., vehicle operator or passenger) and may be a head-up display (HUD).

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
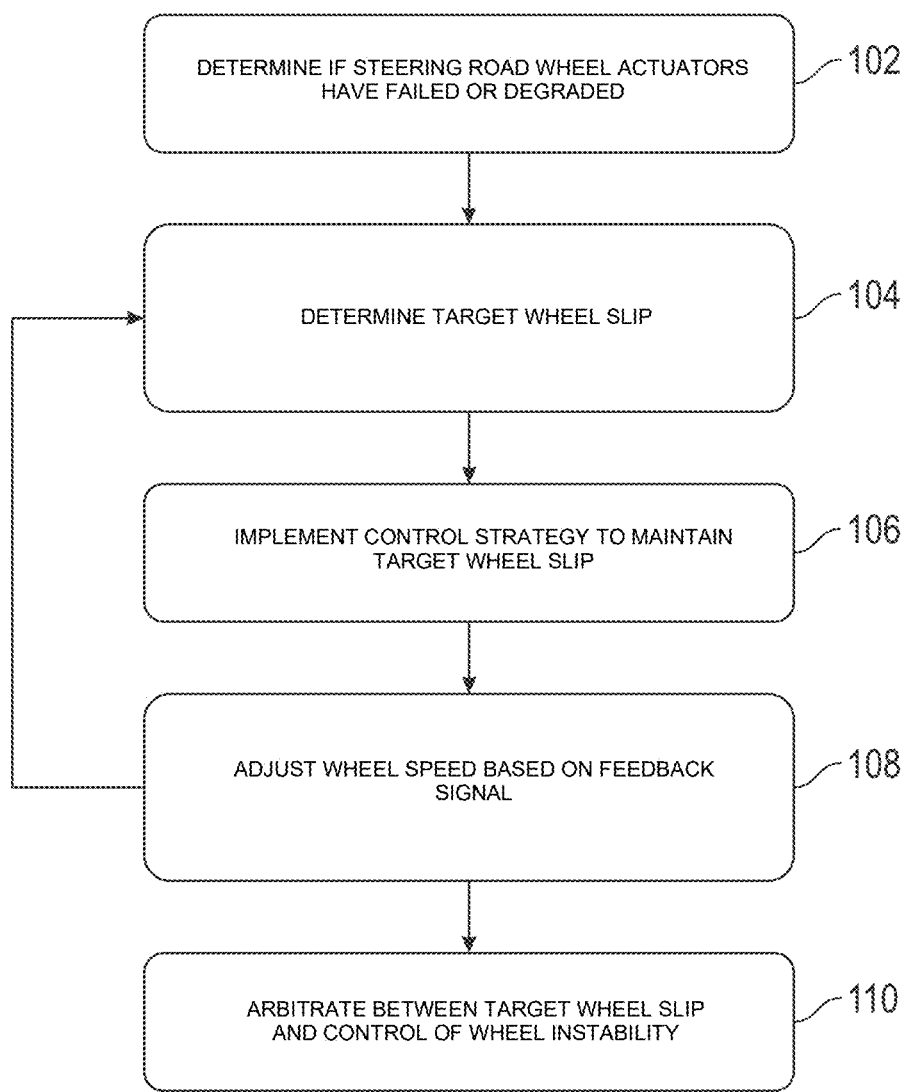
FIG. 2 is a flowchart of a method for controlling the steering-by-wire system.

FIG. 2 is a flowchart of a method 100 for controlling a steering-by-wire system. The method 100 aims provide a torque vectoring and/or differential braking backup system for degradation of steering-by-wire (SbW) system 24 that does not require change in the suspension or steering system 24 and stays effective on even non-steerable axles. The wheel speed control-based method 100 is a solution with no physical changes required in the suspension system. Because the method 100 does not expose the vehicle to wheel instability (e.g., wheel slips are being directly controlled), driving under backup system also does not impose usual side effects such as saturation of tire and potentially vehicle instability. The method 100 begins at block 102. Block 102 entails determining whether one or more steering road wheel actuators have failed or at least degraded to a certain degree. To do so, the controller 34 receives vehicle data, such as signals from the steering road wheel actuators, and then uses the vehicle data to determine whether the road wheel actuators (RWAs) have failed or at least degraded to a certain degree. While the method 100 can be executed when one or more steering road wheel actuators have failed, the steering wheel sensors from the hand wheel angle actuators (HWAs) should be functioning properly. In case of a complete failure of the HWA, the controller 34 reads a tertiary steering angle sensor (SAS) and determines the RWA target. If the controller 34 determines that one or more steering road wheel actuators have failed or at least degraded to a certain degree, then the method 100 proceeds to block 104.

Block 104 entails determining (e.g., calculating) the target wheel slip based on a steering request. The controller 34 therefore receives a steering request from the vehicle driver, the advanced driver-assistance system (ADAS) of the vehicle 10, and/or the autonomous vehicle feature. The steering request includes a requested steering wheel angle. In response to receiving the steering request, the controller 34 calculates the target or desired wheel slip (i.e., the wheel delta speed). The desired yaw rate for a given requested steering wheel angle may be determined using the following equation:

$$\omega_{zd} = \frac{v_x \times \delta_f}{(a+b) + K_{us} v_x^2}$$

where:
$\omega_{zd}$ is the desired yaw rate;
$\delta_f$ is the requested steering wheel angle;
$v_x$ is the longitudinal velocity of the vehicle 10;
a is the distance from center of gravity to the front axle of the vehicle 10;
b is the distance from center of gravity to the rear axle of the vehicle 10; and
$K_{us}$ is the understeer coefficient.

The target wheel slip may be calculated based on based on the steering request using an Ackermann steering geometry of the steer-by-wire system 24. Specifically, the following equations may be used to calculate the target wheel speed.

$$\cot(\delta_o) - \cot(\delta_i) = w_r/1, \cot(\delta) = (\cot(\delta_o) + \cot(\delta_i))/2$$

$$R = \frac{v_x}{\omega_{zd}} = \frac{1}{2}\sqrt{b^2 + (1*\cot(\delta))^2},$$

$$R_o^f = 1/\sin(\delta_o), R_i^f = 1/\sin(\delta_i)$$

$$\omega_{id}^r = \frac{\omega_{zd} \times (R \times \cos(\delta) - w_r/2)}{R_{eff}}$$

$$\omega_{od}^r = \frac{\omega_{zd} \times (R \times \cos(\delta) + w_r/2)}{R_{eff}}$$

$$\omega_{id}^f = \frac{\omega_{zd} \times (R_i^f)}{R_{eff}},$$

$$\omega_{od}^f = \frac{\omega_{zd} \times (R_o^f)}{R_{eff}}$$

where:
v_x is the longitudinal velocity of the vehicle 10;
δ_o is the outer wheel steer angle;
δ_i is the inner wheel steering angle;
w_r is the track size of the vehicle at the rear axle;
l is the wheel base;
δ is the steering wheel angle;
$R_o^f$ is an intermediate variable;
$R_i^f$ is an intermediate variable;
$\omega_{zd}$ is the desired wheel speed;
R is the vehicle turning speed;
b is the distance from the center of gravity to the rear axle of the vehicle 10;
$R_{eff}$ is the tire effective radius;
$\omega_{id}^r$ is the desired wheel speed at the rear inner wheel;
$\omega_{od}^r$ is the desired wheel speed at the rear outer wheel;
$\omega_{id}^f$ is the desired wheel speed at the front inner wheel; and
$\omega_{od}^f$ is the desired wheel speed at the front outer wheel.

After block 104, the method 100 continues to block 106. At block 106, the controller 34 implements a control strategy to maintain the target wheel slip of the vehicle while the vehicle is in motion. The control strategy depends on the driveline configuration of the vehicle. If the vehicle 10 is front-wheel drive, brake torque vectoring is used to maintain the target wheel slip of the vehicle while the vehicle 10 is in motion. If the vehicle 10 is rear-wheel drive, differential braking on the front axle and brake torque vectoring on the rear axle is used to maintain the target wheel slip of the vehicle 10 while the vehicle is in motion. If the vehicle 10 is all-wheel drive, brake torque vectoring on the front and rear axle are used to maintain the target wheel slip of the vehicle 10 while the vehicle is in motion. If the vehicle 10 has two rear electric motors and one front electric motor, torque vectoring on the rear axle and brake torque vectoring on the front axle are used to maintain the target wheel slip of the vehicle while the vehicle 10 is in motion.

The control strategy to maintain the target wheel slip of the vehicle 10 while the vehicle 10 is in motion may be determined using the following equations of motion:

$$Ma_x = \sum_{i=1}^{4}(F_{xi}\cos\delta_i - F_{yi}\sin\delta_i)$$

$$\left.\begin{array}{l}T_{w1} = \frac{n_f}{2}(T_{eFr}) - T_{br_1}\\T_{w2} = \frac{n_f}{2}(T_{eFr}) - T_{br_2}\\T_{w3} = (T_{eRe_{rl}}) - T_{br_3}\\T_{w4} = (T_{eRe_{rr}}) - T_{br_4}\end{array}\right\} \to I_w\dot\omega_1 = T_{wi} - R_{eff}F_{x_i}, i=1,2,3,4$$

where:
M is the mass of the vehicle 10;
a is the acceleration of the vehicle 10;
$F_{xi}$ is the longitudinal tire force at each corner of the vehicle, and index i∈{1,2,3,4};
δ_i is the inner steering road angle;
$F_{yi}$ is the lateral tire force at each corner of the vehicle 10, index i∈{1,2,3,4};
$T_{w1}$ is the wheel torque at each corner of the vehicle 10, index i∈{1,2,3,4};
$n_f$ is the differential gear ratio;
$T_{eFr}$ is the front axle torque;
$T_{br_1}$ is the rear axle torque;
$I_w$ is the wheel moment of inertia;
$\omega_i$ is the wheel acceleration;
$T_{wi}$ is the wheel tractive torque at each corner of the vehicle 10, index i∈{1,2,3,4};
$R_{eff}$ is the tire effective radius;
$T_{br_i}$ is the wheel tractive torque at each corner of the vehicle 10, index i∈{1,2,3,4}; and
$T_{eRe_{rl}}$ and $T_{eRe_{rr}}$ are the wheel tractive torque at rear right corners, respectively.

The objective of the control strategy is to follow the desired wheel speeds at each corner of the vehicle 10 while the overall intended vehicle acceleration and longitudinal speed are maintained. Positive extra acceleration is not allowed in the control strategy. Further, in the control strategy, negative deviation from a reference acceleration and longitudinal speed is penalized but due to limitation in actuation capabilities. While the control strategy described above may be used to maintain the target wheel slip of the vehicle 10 while the vehicle 10 is in motion, any other suitable control strategy may be employed to achieve the target wheel slip.

A model predictive control (MPC) theory may alternatively be used as a control strategy to maintain the target wheel slip of the vehicle 10 while the vehicle 10 is in motion. In this case, the MPC includes a linear time-varying (LTV) solver to solve a constrained optimization problem at each sampling time with the following objective and cost terms:

$$J(x(t), U) = \sum_{k=1}^{p}\underbrace{\|y_{t+k,t} - y_{t+k,t}^{Ref}\|_{W_1}^2}_{\text{motion error term}} + \sum_{k=0}^{p-1}\underbrace{\|u_{t+k,t} - u_{t+k,t}^{Ref}\|_{W_2}^2}_{\text{control action error}} +$$

$$\underbrace{\|\Delta u_{t+k,t} - \Delta u_{t+k,t}^{Ref}\|_{W_3}^2}_{\text{control action variation error}} + \underbrace{\|T_{f_{t+k,t}} + T_{rl_{t+k,t}} + T_{rr_{t+k,t}} - T_{driver_{t+k,t}}^{Ref}\|_{W_4}^2}_{\text{total torque error}}$$

s.t. $x_{t+k+1,t} = A(x_{t+k,t} - \bar{x}_t) + B(u_{t+k,t} - \bar{u}_t) + W, k = 0, \ldots, p-1$ $x_0 = x(t)$ $u_{min} \leq u_{t+k} \leq u_{max}, k = 0, \ldots, N-1$ $y_{min} \leq Cx_{t+k} \leq y_{max}, k = 1, \ldots, N$ where:
$y_{t+k,t}$ is the predicted longitudinal velocity of the vehicle 10;
$y_{t+k,t}^{Ref}$ is the reference longitudinal velocity of the vehicle 10;
$u_{t+k,t}$ are the control actions including front, rear left, and rear right torques distributions (both traction and braking);
$u_{t+k,t}^{Ref}$ are the reference control actions including front, rear left and rear right torque distributions (both traction and braking).
$\Delta u_{t+k,t}$ is a control action variation;
$\Delta u_{t+k,t}^{Ref}$ is a reference control action variation;
J(x(t),U) is the objective function of the optimization problem;
p is the the size of prediction horizon;
x is the vehicle states vector;
t is the variable "time";
U is the control action vector;
$y_{t+k,t}^{Ref}$ is the target vehicle state at time "k" within the prediction horizon started from "t"
$W_1$ is the weight matrix for state tracking term;
$W_2$ is the weight matrix for control actions;
$W_3$ is the weight matrix for control action rates;

$W_4$ is the weight matrix for total torque satisfaction;
$T_{f_{t+k,t}}$ is a front torque distribution sequence;
$T_{rl_{t+k,t}}$ is a rear left torque distribution sequence;
$T_{rr_{t+k,t}}$ is a rear right torque distribution sequence;
$T_{driver_{t+k,t}}^{Ref}$ is a driver torque request;
$x_{t+k+1,t}$ is _the predicted vehicle state at time "t+k+1" within the prediction horizon started from t;
A is the system state matrix;
B is the control contribution matrix;
W is the model disturbance;
$\bar{x}_r$ is the nominal operating point for the state;
$\bar{u}_r$ is the nominal operating point for the command;
k is the counter for prediction horizon;
$u_{min}$ is the lower bound of control actions;
$u_{t+k}$ is the control action at time k within prediction horizon starting at time t;
$u_{max}$ is the higher bound of control actions;
$y_{min}$ is the lower bound of output variables;
$Cx_{t+k}$ is the output matrix C multiple by vehicle states at time k within prediction horizon starting at time t;
$y_{max}$ is _Higher bound of output variables;
$x_0$ is _initial state x; and
x(t) is _vehicle state variable at time t.

In the MPC described above, the output may be described as follows:

$$y = \{v_x, a_x, \omega_1, \omega_2, \omega_3, \omega_4\}^T$$

where:
y
$v_x$ is the longitudinal velocity of the vehicle 10;
$a_x$ is the longitudinal acceleration of the vehicle 10;
$\omega_1$ is the wheel speed of the front left wheel;
$\omega_2$ is the wheel speed of the front right wheel;
$\omega_3$ is the wheel speed of the rear left wheel; and
$\omega_4$ is the wheel speed of the rear right wheel.

The nominal operating point for the state may be calculated based on solving the nonlinear vehicle/wheel model, and the nominal operating point for the command may be calculated outside the MPC by, for example, feedforward control.

The adaptive cost function may be optimized in an online fashion to find a feasible set of control actions to minimize the error. The cost function may be expressed as follows:

$$U^*(x(t)) \triangleq \arg\min_U \frac{1}{2} U'HU + x'(t)C'U + \frac{1}{2}x'(t)\Upsilon\Gamma x(t)$$

$$\text{s.t. } GU \leq W + Sx(t)$$

where: $U^*(x(t)) = [u'_0{}^*(x(t)) \ldots u'_{N-1}{}^*(x(t))]'$ is the optimal solution, H>0 and C, Y, G, W, S are matrices of appropriate dimensions; and
x' (t) is the transpose of vehicle state vector;
$\Gamma$ is the weight matrix for vehicle states in objective function;
G is the weight matrix for control actions;
W is the disturbance matrix;
S is the weight matrix for vehicle states in constraint function
U is the control action vector;
C' is the state to control action penalization matrix;
H is the Hessian matrix;
$u'_0{}^*(x(t))$ is the first variable of control action sequence within prediction horizon; and
$u_{N-1}{}^*(x(t))$ is the last variable of control action sequence within prediction horizon.

The MPC control algorithm is based on the following iterations: at time t, measure or estimate the current state x(t), solve the quadratic programming (QP) problem to get to the optimal sequence. If the future input moves $U^*(x(t))$, apply $u(t)=u_0{}^*(x(t))$. Then, discard the remaining optimal moves, and repeat the procedure again at time t+1.

After block 106, the method 100 proceeds to block 108. At block 108, the controller 34 adjusts a wheel speed of one or more wheels 17 of the vehicle 10 based on a feedback signal. The feedback signal may originate from the sensors 40 and is indicative of a road wheel angle while the vehicle 10 is in motion. The desired wheel speeds should be adjusted to ensure that the control system remains robust under uncertainties, such as inaccurate effective tire radius, road conditions, etc. A feedback from, for example, the rack position sensor, or an estimation of the road wheel angle and/or the rack position may be used to adjust the wheel speed targets to achieve the desired steering angle. The wheel speed adjustment strategy may be any suitable feedback method. For example, a proportional control strategy may be used as a feedback method and may be expressed as follows:

$$\omega_d^* = \omega_d + K_p(\Delta_r^d - \Delta_r)$$

where:
$\omega_d^*$ is the adjusted initial wheel speed target;
$\omega_d$ is initial wheel speed target;
$K_p$ is the proportional control gain matrix;
$\Delta_r^d$ is desired steering rack position; and
$\Delta_r$ is actual steering rack position.

Then, the method 100 proceeds to block 110. At block 110, the controller 34 arbitrates between the target wheel slip to follow a desired path and controlling wheel instability. Some possible wheel slips determined by the method 100 are not consistent with the desired wheel slip requested by the vehicle motion control (wheel stability) feature. In such a case, the priority is generally given to the wheel slip requested by the wheel stability feature. As a result, the steering request by the driver cannot be honored. The fact that the driver steering angle request is not a feasible command will be communication to the driver via the user interface 23. However, if the tire capacity in any axle or corner is available, then the torque capacity at that corner may be utilized first before disregarding the driver steering angle request.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling a steer-by-wire system, comprising:
   receiving vehicle data and a steering request from a vehicle;
   determining whether a steering road wheel actuator of the vehicle has failed using the vehicle data;
   in response to determining that the steering road wheel actuator of the vehicle has failed, determining a target wheel slip of the vehicle based on the steering request;
   maintaining the target wheel slip of the vehicle while the vehicle is in motion, wherein maintaining the target wheel slip includes implementing a control strategy based on a driveline configuration of the vehicle, wherein the control strategy includes: brake torque vectoring for front-wheel drive; differential braking on front axle and brake torque vectoring on rear axle for rear-wheel drive; brake torque vectoring on front and rear axle for all-wheel drive; and torque vectoring on rear axle and brake torque vectoring on front axle for vehicles with two rear electric motors and one front electric motor; and
   adjusting a wheel speed of at least one wheel of the vehicle based on a feedback signal, wherein the feedback signal is indicative of a road wheel angle while the vehicle is in motion.

2. The method of claim 1, further comprising arbitrating between the target wheel slip to follow a desired path and controlling wheel instability by:
   determining whether wheel slips are inconsistent with a desired wheel slip requested by a vehicle motion control feature;
   in response to determining the wheel slips are inconsistent, giving priority to wheel stability control over the steering request, notifying a user via an interface that the steering request is not feasible, and utilizing available tire capacity at any axle or corner before disregarding the steering request.

3. The method of claim 2, wherein the steering request includes a requested steering wheel angle, and the target wheel slip of the vehicle is calculated as a function of the requested steering wheel angle.

4. The method of claim 2, wherein the target wheel slip of the vehicle is determined based on the steering request using an Ackermann steering geometry of the steer-by-wire system according to the following equations:

$$\cos(\delta_o) - \cot(\delta_i) = w_r/1, \cot(\delta) = (\cot(\delta_o) + \cot(\delta_i))/2$$

$$R = \frac{V_x}{\omega_{zd}} = \frac{1}{2}\sqrt{b^2 + (1*\cot(\delta))^2},$$

$$R_o^f = 1/\sin(\delta_o), R_i^f = 1/\sin(\delta_i)$$

$$\omega_{id}^r = \frac{\omega_{zd} \times (R \times \cos(\delta) - w_r/2)}{R_{\textit{eff}}}$$

$$\omega_{od}^r = \frac{\omega_{zd} \times (R \times \cos(\delta) + w_r/2)}{R_{\textit{eff}}}$$

$$\omega_{id}^f = \frac{\omega_{zd} \times (R_i^f)}{R_{\textit{eff}}},$$

$$\omega_{od}^f = \frac{\omega_{zd} \times (R_o^f)}{R_{\textit{eff}}}$$

where:
$v_x$ is the longitudinal velocity of the vehicle 10;

$\delta_o$ is the outer wheel steer angle;
$\delta_i$ is the inner wheel steering angle;
$w_r$ is the track size of the vehicle at the rear axle;
l is the wheel base;
$\delta$ is the steering wheel angle;
$R_o^f$ is an intermediate variable;
$R_i^f$ is an intermediate variable;
$\omega_{zd}$ is the desired wheel speed;
R is the vehicle turning speed;
b is the distance from the center of gravity to the rear axle of the vehicle 10;
$R_{eff}$ is the tire effective radius;
$\omega_{id}^r$ is the desired wheel speed at the rear inner wheel;
$\omega_{od}^r$ is the desired wheel speed at the rear outer wheel;
$\omega_{id}^f$ is the desired wheel speed at the front inner wheel; and
$\omega_{od}^f$ is the desired wheel speed at the front outer wheel.

5. The method of claim 1, further comprising using a model predictive control (MPC) to maintain the target wheel slip of the vehicle while the vehicle is in motion.

6. The method of claim 5, wherein the MPC includes a linear time-varying (LTV) solver.

7. The method of claim 1, wherein adjusting the wheel speed based on the feedback signal comprises:
receiving a rack position sensor feedback signal indicative of the road wheel angle;
compensating for system uncertainties including at least one of inaccurate effective tire radius and varying road conditions;
determining a wheel speed adjustment value based on the rack position sensor feedback signal and a difference between an actual steering angle and a target steering angle; and
adjusting individual wheel speeds to achieve the target steering angle while maintaining vehicle stability.

8. A vehicle, comprising:
a plurality of sensors;
a steer-by-wire system including a steering road wheel actuator;
a controller in communication with the steer-by-wire system and the plurality of sensors, wherein the controller is programmed to:
receive vehicle data and a steering request from a vehicle;
determine whether a steering road wheel actuator of the vehicle has failed using the vehicle data;
in response to determining that the steering road wheel actuator of the vehicle has failed, determine a target wheel slip of the vehicle based on the steering request;
maintain the target wheel slip of the vehicle while the vehicle is in motion, wherein maintaining the target wheel slip includes implementing a control strategy based on a driveline configuration of the vehicle, wherein the control strategy includes: brake torque vectoring for front-wheel drive; differential braking on front axle and brake torque vectoring on rear axle for rear-wheel drive; brake torque vectoring on front and rear axle for all-wheel drive; and torque vectoring on rear axle and brake torque vectoring on front axle for vehicles with two rear electric motors and one front electric motor; and
adjust a wheel speed of at least one wheel of the vehicle based on a feedback signal, wherein the feedback signal is indicative of a road wheel angle while the vehicle is in motion.

9. The vehicle of claim 8, wherein the controller is programmed to arbitrate between the target wheel slip to follow a desired path and controlling wheel instability by:
determining whether wheel slips are inconsistent with a desired wheel slip requested by a vehicle motion control feature;
in response to determining the wheel slips are inconsistent, giving priority to wheel stability control over the steering request, notifying a user via an interface that the steering request is not feasible, and utilizing available tire capacity at any axle or corner before disregarding the steering request.

10. The vehicle of claim 9, wherein the steering request includes a requested steering wheel angle, and the target wheel slip of the vehicle is calculated as a function of the requested steering wheel angle.

11. The vehicle of claim 9, wherein the target wheel slip of the vehicle is determined based on the steering request using an Ackermann steering geometry of the steer-by-wire system according to the following equations:

$$\cos(\delta_o) - \cot(\delta_i) = w_r/l, \cot(\delta) = (\cot(\delta_o) + \cot(\delta_i))/2$$

$$R = \frac{V_x}{\omega_{zd}} = \frac{1}{2}\sqrt{b^2 + (1*\cot(\delta))^2},$$

$$R_o^f = 1/\sin(\delta_o), R_i^f = 1/\sin(\delta_i)$$

$$\omega_{id}^r = \frac{\omega_{zd} \times (R \times \cos(\delta) - w_r/2)}{R_{eff}}$$

$$\omega_{od}^r = \frac{\omega_{zd} \times (R \times \cos(\delta) + w_r/2)}{R_{eff}}$$

$$\omega_{id}^f = \frac{\omega_{zd} \times (R_i^f)}{R_{eff}},$$

$$\omega_{od}^f = \frac{\omega_{zd} \times (R_o^f)}{R_{eff}}$$

where:
$v_y$ is the longitudinal velocity of the vehicle 10;
$\delta_o$ is the outer wheel steer angle;
$\delta_i$ is the inner wheel steering angle;
$w_r$ is the track size of the vehicle at the rear axle;
l is the wheel base;
$\delta$ is the steering wheel angle;
$R_o^f$ is an intermediate variable;
$R_i^f$ is an intermediate variable;
$\omega_{zd}$ is the desired wheel speed;
R is the vehicle turning speed;
b is the distance from the center of gravity to the rear axle of the vehicle 10;
$R_{eff}$ is the tire effective radius;
$\omega_{id}^r$ is the desired wheel speed at the rear inner wheel;
$\omega_{od}^r$ is the desired wheel speed at the rear outer wheel;
$\omega_{id}^f$ is the desired wheel speed at the front inner wheel; and
$\omega_{od}^f$ is the desired wheel speed at the front outer wheel.

12. The vehicle of claim 8, wherein the controller is programmed to use a model predictive control (MPC) to maintain the target wheel slip of the vehicle while the vehicle is in motion.

13. The vehicle of claim 12, wherein the MPC includes a linear time-varying (LTV) solver.

14. The vehicle of claim 8, wherein the controller is programmed to use a control strategy to maintain the target wheel slip of the vehicle while the vehicle is in motion, wherein the control strategy depends on a driveline configuration of the vehicle.

15. A tangible, non-transitory, machine-readable medium, comprising machine-readable instructions, that when executed by a processor, cause the processor to:
receive vehicle data and a steering request from a vehicle;
determine whether a steering road wheel actuator of the vehicle has failed using the vehicle data;
in response to determining that the steering road wheel actuator of the vehicle has failed, determine a target wheel slip of the vehicle based on the steering request;
maintain the target wheel slip of the vehicle while the vehicle is in motion, wherein maintaining the target wheel slip includes implementing a control strategy based on a driveline configuration of the vehicle, wherein the control strategy includes: brake torque vectoring for front-wheel drive; differential braking on front axle and brake torque vectoring on rear axle for rear-wheel drive; brake torque vectoring on front and rear axle for all-wheel drive; and torque vectoring on rear axle and brake torque vectoring on front axle for vehicles with two rear electric motors and one front electric motor; and
adjust a wheel speed of at least one wheel of the vehicle based on a feedback signal, wherein the feedback signal is indicative of a road wheel angle while the vehicle is in motion.

16. The tangible, non-transitory, machine-readable medium of claim 15, wherein the tangible, non-transitory, machine-readable medium further comprising machine-readable instructions, that when executed by the processor, causes the processor to arbitrate between the target wheel slip to follow a desired path and controlling wheel instability, wherein when wheel slips are inconsistent with desired wheel slip: priority is given to wheel stability control; the steering request is not honored; a user is notified via interface that the request is not feasible; and available tire capacity at any axle or corner is utilized before disregarding the steering request.

17. The tangible, non-transitory, machine-readable medium of claim 16, wherein the steering request includes a requested steering wheel angle, and the target wheel slip of the vehicle is calculated as a function of the requested steering wheel angle.

18. The tangible, non-transitory, machine-readable medium of claim 17, wherein the target wheel slip of the vehicle is determined based on the steering request using an Ackermann steering geometry of a steer-by-wire system of the vehicle.

19. The tangible, non-transitory, machine-readable medium of claim 18, wherein the tangible, non-transitory, machine-readable medium further comprising machine-readable instructions, that when executed by the processor, causes the processor to use a model predictive control (MPC) to maintain the target wheel slip of the vehicle while the vehicle is in motion.

20. The tangible, non-transitory, machine-readable medium of claim 19, wherein the MPC includes a linear time-varying (LTV) solver.

* * * * *